(12) United States Patent
Peterson et al.

(10) Patent No.: US 8,688,331 B2
(45) Date of Patent: Apr. 1, 2014

(54) METHOD TO ENHANCE PERFORMANCE OF SENSOR-BASED IMPLEMENT HEIGHT CONTROL

(75) Inventors: John Peterson, Jackson, MN (US); Quentin Guhr, Hillsboro, KS (US)

(73) Assignee: AGCO Corporation, Duluth, GA (US)

( * ) Notice: Subject to any disclaimer, the term of this patent is extended or adjusted under 35 U.S.C. 154(b) by 612 days.

(21) Appl. No.: 12/642,005

(22) Filed: Dec. 18, 2009

(65) Prior Publication Data

US 2011/0153168 A1 Jun. 23, 2011

(51) Int. Cl.
*G06F 7/70* (2006.01)
(52) U.S. Cl.
USPC ............... 701/50; 701/26; 701/41; 701/533; 280/442; 280/443; 280/444; 280/445; 280/441; 172/278; 172/318; 172/321; 172/383; 172/4.5; 340/988; 340/990
(58) Field of Classification Search
USPC ............................................................ 701/50
See application file for complete search history.

(56) References Cited

U.S. PATENT DOCUMENTS

| | | | | |
|---|---|---|---|---|
| 5,467,829 A | * | 11/1995 | Barton et al. ................... | 172/4.5 |
| 5,931,882 A | * | 8/1999 | Fick et al. ....................... | 701/50 |
| 6,085,135 A | * | 7/2000 | Steckel ........................... | 701/50 |
| 6,236,924 B1 | * | 5/2001 | Motz et al. ...................... | 701/50 |
| 2002/0100819 A1 | * | 8/2002 | Taylor et al. ................... | 239/543 |
| 2004/0231308 A1 | * | 11/2004 | Murphy et al. ................. | 56/14.9 |
| 2008/0177449 A1 | * | 7/2008 | Pickett et al. .................. | 701/50 |

FOREIGN PATENT DOCUMENTS

WO WO-2008/088916 A2 7/2008

OTHER PUBLICATIONS

International Search Report for International Application No. PCT/IB2010/003091 Dated May 26, 2011.

* cited by examiner

*Primary Examiner* — Redhwan k Mawari (57) ABSTRACT

In an example embodiment, a system for providing a height change command for an implement, comprises a height control module configured to interact with a computer, and configured to receive topographical data, provide a virtual field map based on said topographical data, provide a forward view polygon for an implement based on said virtual field map, and provide a height change command for said implement based on said forward view polygon and an implement control unit configured to receive said height change command and control movement of said implement.

4 Claims, 7 Drawing Sheets

METHOD TO ENHANCE PERFORMANCE OF SENSOR-BASED IMPLEMENT HEIGHT CONTROL

TECHNICAL FIELD

The present invention relates generally to agricultural vehicles, and more specifically to height control systems for raising or lowering the height of attached implements.

BACKGROUND

Global competition compels farmers to modify cultivation practices by incorporating more cost-effective farming techniques and acquiring more efficient machinery. In doing so, farmers have increasingly turned to larger machinery and more sophisticated technology that automates and optimizes the operation of agricultural vehicles and equipment. Liquid and dry air boom type crop applicators have been used to apply a variety of crop inputs, such as fertilizer, nutrients, seed and crop protectants, herbicides, insecticides, and the like in site specific farming applications. Agricultural vehicles can apply crop inputs based on algorithms that incorporate geographical information as well as soil data, crop data, and the like to determine the amount and placement of crop inputs needed to maximize crop production.

To decrease the number of passes needed to traverse an entire field, farmers have turned to implements with increased widths, and booms extending 90 feet or more in width can now be employed. Extended booms are manufactured in hinged sections that can be controlled by a system of hydraulic cylinders to allow manipulation of individual sections. Sections can be extended outward at various angles or folded inward to avoid obstacles or minimize the space needed to store the vehicles. In addition to lateral control of the boom sections, vertical control of the boom sections can also be exercised. In many cases the terrain to be traversed by an agricultural vehicle supporting an attached implement may have sloping and uneven field conditions such as hills and terraces. The difficulties caused by uneven terrain can be exacerbated by wide-span spray booms that can create relatively large moment arms at the vehicles. For chemical spraying applications the spray nozzles mounted to the booms should preferably be positioned at uniform heights above the field or crop surface. However, when traversing a sloping field, the boom sections on one side of the vehicle may need to be raised while the boom sections on the other side may need to be lowered to maintain a relatively uniform spraying height for effective coverage. In addition, an implement too close to the ground or crop surface may damage crops or incur damage from a collision with an obstacle.

To maintain a desired boom height above the ground, boom sections can be manually raised or lowered by an operator. However, manually controlled boom operations are subject to human factor errors. Operators may not have an unobstructed view of the field in front of them, or may not be able to detect topographical changes over the entire width of area forward of the boom. In addition, operators may have delayed reaction times that prevent them from manipulating the booms quickly enough to avoid obstacles or compensate for inclines, a problem that can be exacerbated by fatigue from long hours in the field.

To avoid the problems described above, many agricultural vehicles provide means that automatically alter boom height. An array of sensors can provide real-time data that can be used to determine whether a boom section needs to be raised or lowered during a field pass. For example, sensors that can perform or assist in the performance of range-finding operations can provide information about the actual distance between the implement and the ground. However, the effectiveness of real-time sensors in driving height control commands is limited by ground speed and obstacle characteristics, and may not prevent collisions.

SUMMARY OF THE INVENTION

The present invention provides a system for controlling the height of an implement on an agricultural vehicle. An example height control system can include a computer, a height control module (HCM) configured to interact with the computer, one or more sensors communicatively coupled to the height control module, and an implement control unit configured to receive a change height command from the height control module and in response effect a change in implement height.

In an exemplary embodiment, a height control module can comprise a virtual field module configured to receive topographical information, generate a virtual field map using said topographical information, and set a forward view polygon for an implement based on said virtual field map and received implement data; and a controller communicatively coupled to said virtual field module and configured to provide height change commands for the implement based on the forward view polygon. In an exemplary embodiment a height control module is comprised of hardware, software, firmware or combination thereof and is configured to interact with a computer or processor device.

The virtual field module can be configured to receive topographical data from a variety of sources, and use the data to create a composite virtual field containing all received topographical information. For example, data can be obtained from a global positioning satellite (GPS) receiver, from a data base in which topographical data obtained from previous field passes is stored, from user input files, and/or other sources. The virtual field generated can then be used as a basis for setting forward view polygons for one or more implement sections that indicate the topography in the vicinity of the implement in the direction of forward motion. Implement height control commands such as initialization commands provided when the agricultural vehicle is first started, as well as subsequent commands provided as the vehicle navigates the terrain can be generated based on the forward view polygons. Data obtained from external sensors mounted on the implement can be used to verify absolute values.

A method for controlling implement height can include: providing a virtual field map based on topographical data; setting a forward view polygon for an implement based on the virtual field and implement characteristics; and providing a height change command for the implement based on information in the forward view polygon. An example method can include receiving topographical data, creating a virtual field using the topographical data files, locating the machine's current position on the virtual field, receiving an implement's width, receiving the desired height for the implement, receiving the machine's current ground speed, converting ground speed to displacement, setting a forward view polygon based on the displacement calculation and implement width, determining the need to alter implement height based on the forward view polygon, providing a change height command and monitoring actual height with one or more external sensors. The method may also include determining the desired position of particular sections of an implement and manipulating those particular sections.

DETAILED DESCRIPTION OF EXAMPLE EMBODIMENTS

Exemplary embodiments of the invention are presented herein; however, the invention may be embodied in a variety of alternative forms, as will be apparent to those skilled in the art. To facilitate understanding of the invention, and provide a basis for the claims, various figures are included in the description. The figures are not drawn to scale and related elements may be omitted so as to emphasize the novel features of the invention. Structural and functional details depicted in the figures are provided for the purpose of teaching the practice of the invention to those skilled in the art and are not to be interpreted as limitations. While exemplary embodiments are discussed in the context of an agricultural vehicle, it will be understood that the present invention is not limited to that particular arrangement.

Figure 1:
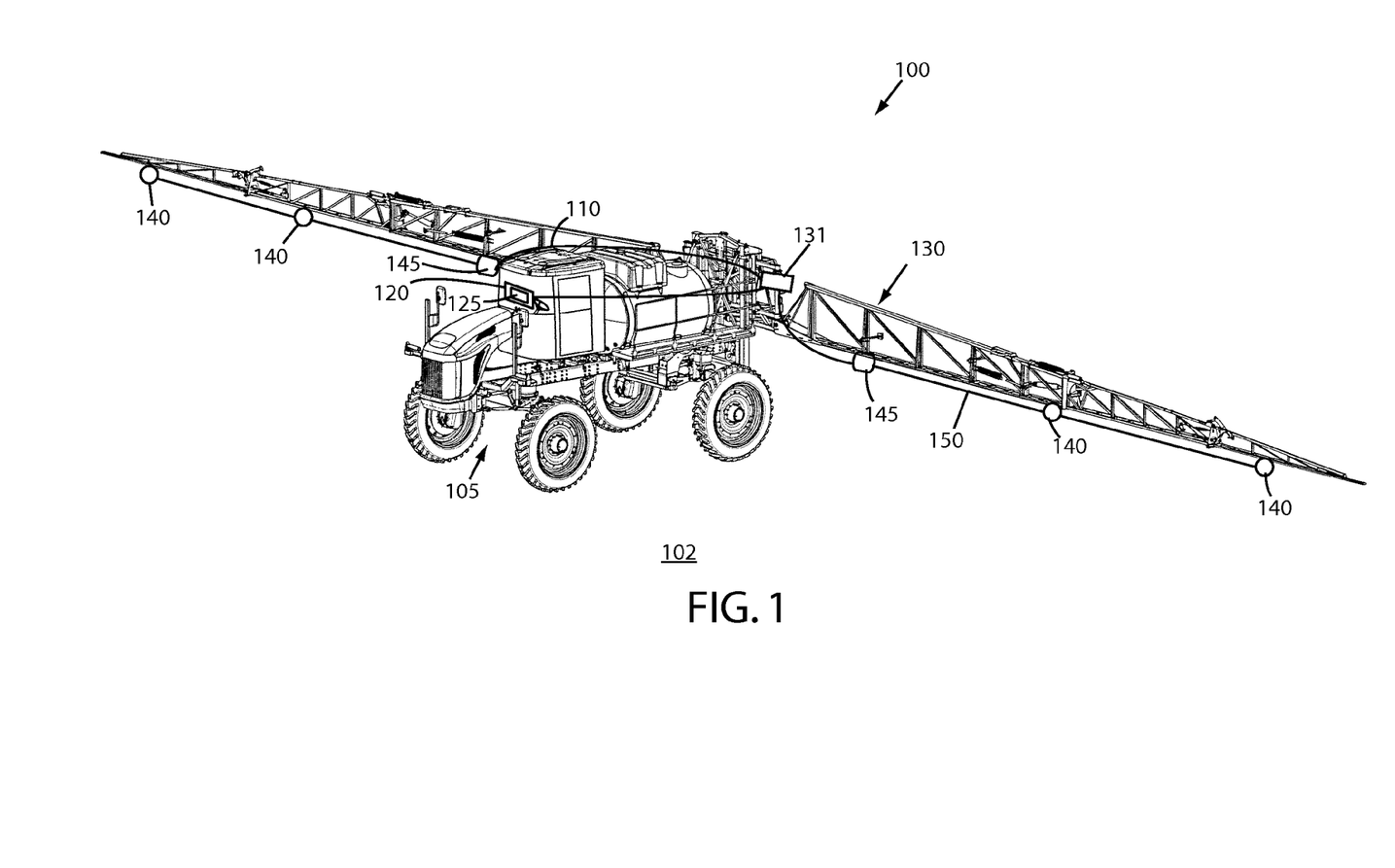
FIG. 1 shows a perspective view of an example embodiment of a vehicle with a sensor-based implement height control.

Turning to the figures, wherein like numbers represent like elements throughout the several views, FIG. 1 shows an example embodiment 100 in which an agricultural vehicle 105 having a cab 110 equipped with a computer 120 and height control module 125, has an attached implement 130, such as a sprayer device mounted on an extended boom. The vehicle 105 is located in a field 102 which can consist of varying topography and assorted crops, obstacles, terraces, etc. In an example embodiment the agricultural vehicle 105 can be a an input applicator vehicle such as the Terra-Gator®, the RoGator®, and the Liqui-Max®, manufactured by AGCO Corp.

In an example embodiment, the implement 130 can be in the form of a crop applicator boom structure comprising a plurality of hinged sections that can be manipulated while navigating the field 102. A boom control unit (BCU) 131 can control operation and manipulation of the implement 130. One or more height sensors 140 can be deployed along the implement 130, as well as one or more displacement sensors 145. Sensors 140 and 145 can be coupled to the computer 120 and the BCU 131 via a data bus 150.

Figure 2:
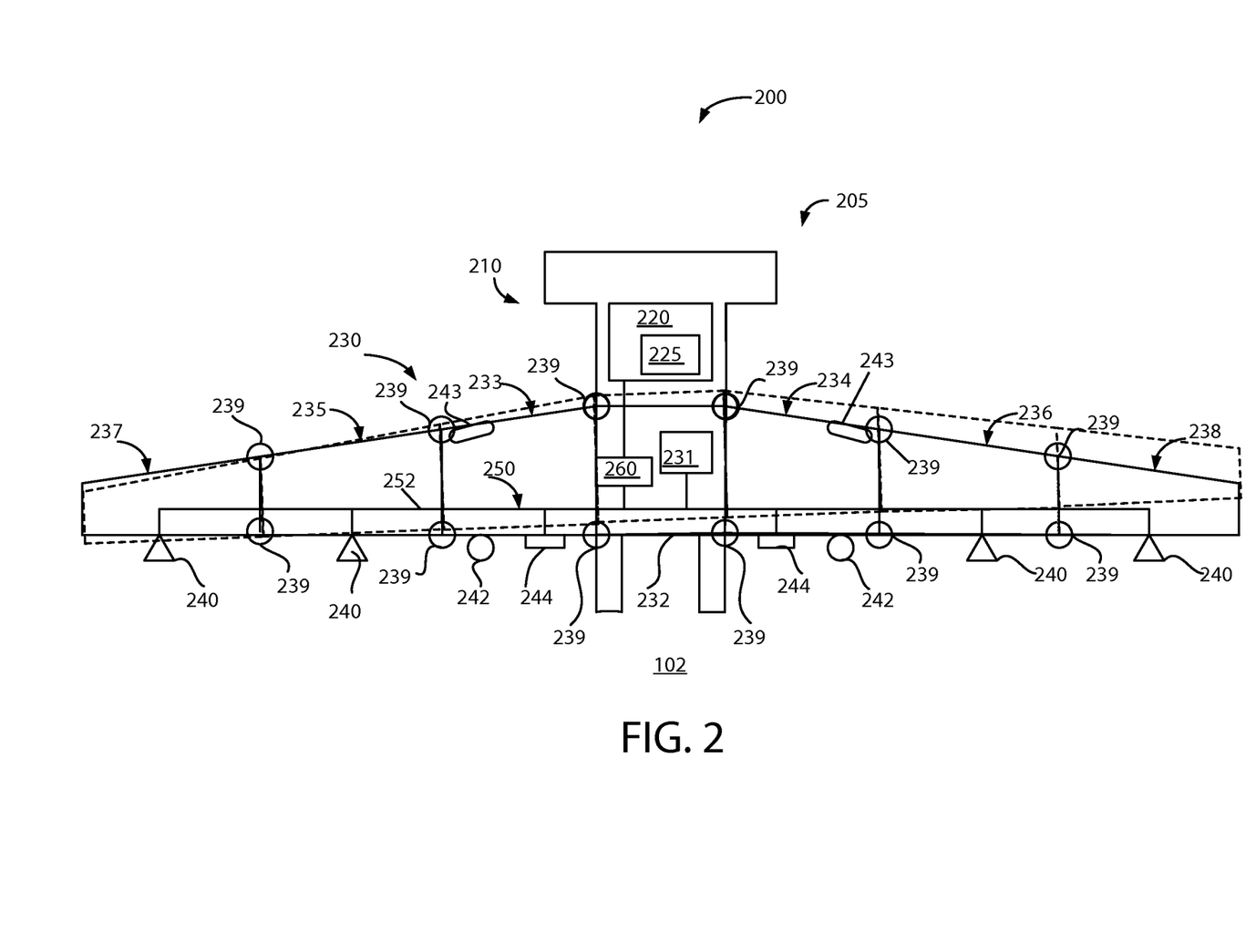
FIG. 2 depicts a schematic diagram of an example embodiment of a height control system.

FIG. 2 depicts an example embodiment 200 having a cab 210 and an implement in the form of a sprayer boom 230. Within the cab 210 there is a computer 220 and a height control module 225 that can interact with the computer 220. The boom 230 frame can comprise a center section 232, a left inner section 233, a left intermediate section 235 and a left tip section 237, a right inner section 234, a right intermediate section 236 and a right tip section 238. Adjacent boom sections can be movably connected to one another, and be pivotable about a boom pivot point. Boom sections can be manipulated by boom actuators that can comprise hydraulic cylinders controlled hydraulically by hydraulic valves. For example hydraulic cylinders may be positioned at or near the boom pivot points, the pivot points characterized by the location of a boom pivot pin, to allow the sections of the boom to be manipulated.

One or more sensors 240 can be positioned on the boom 230 to gauge the height of the boom 230 above the ground 102. The sensors 240 can comprise ultrasonic sensors having transducer units that convert electrical energy to sound wave pulses and convert resulting ground-reflected sound waves back to electrical energy, measuring the elapsed time between pulses and returned echoes to determine the distance between the implement section and the ground. The transducer unit can include a controller to drive the transducer in response to a command from a computer 220, and/or drive the transducer to emit pulses at a predetermined rate. However, sensors 240 are not limited to ultrasonic sensors but can also be in the form of sensors that use other range-finding techniques as known and practiced in the art. Sensor 240 data can be provided to a sensor input module 260 via a data bus 250. The sensor input module 260 is communicatively coupled to the computer 220. The sensor input module may be separate or a part of the computer 220.

One or more height cylinders 242 can be deployed along the boom width to raise or lower a boom section in response to a height change command. In an example embodiment, the height cylinder 242 can be in the form of a hydraulic cylinder with movable pistons. A system of hydraulic cylinders, each an associated hydraulic pump and valve assembly can be deployed along the boom and used to control boom movement and positioning. The hydraulic system of cylinders and valve assemblies can be electronically controlled by a BCU 231 communicatively coupled to the computer 220. Similarly, one or more leveling cylinders 243 can be used along the boom to adjust vertical positioning of the boom.

In addition to the height sensor(s) 240, one or more displacement sensors 244 can be disposed along the boom 230 width. In an example embodiment, the displacement sensor 244 is a linear sensor configured to determine boom position by measuring the length or displacement of the hydraulic cylinder associated with movement of the particular boom section. For example, a hydraulic cylinder associated with movement of the inner section 234 may be attached at or near pivot pin 239. The displacement sensor 244 can measure the length of the cylinder to determine the positioning or height change of the boom section 236. Extension of a cylinder is related to the amount of force applied, which can be used to determine the distance the boom is displaced. Thus the displacement sensor 244 can be used to monitor height or angle changes of the boom 230. The boom 230 may thus be manipulated to change the boom position from an initial position to a second position as shown in dashed lines in FIG. 2. Furthermore, as discussed later, the individual boom sections 232-238 may be manipulated to change their positions.

The ultrasonic sensors 240 and displacement sensors 244 can be coupled to the sensor input module 260 that receives sensor output (such as height and displacement data) and can provide it as input to the computer 220. The cable 252 and input module 260 preferably allow sensor output to be communicated to various control modules on the vehicle. Additional sensors such as roll or tilt sensors and the like may also be deployed, although not shown in the drawing. Although FIG. 2 shows sensor output provided to the input module 260 which is in turn connected to the computer 220, a more distributed control system can be implemented in which various sensor control nodes are arranged along the boom width, each node configured to receive local sensor input and able to communicate that sensor input to the computer 220 via a communications bus.

Figure 3:
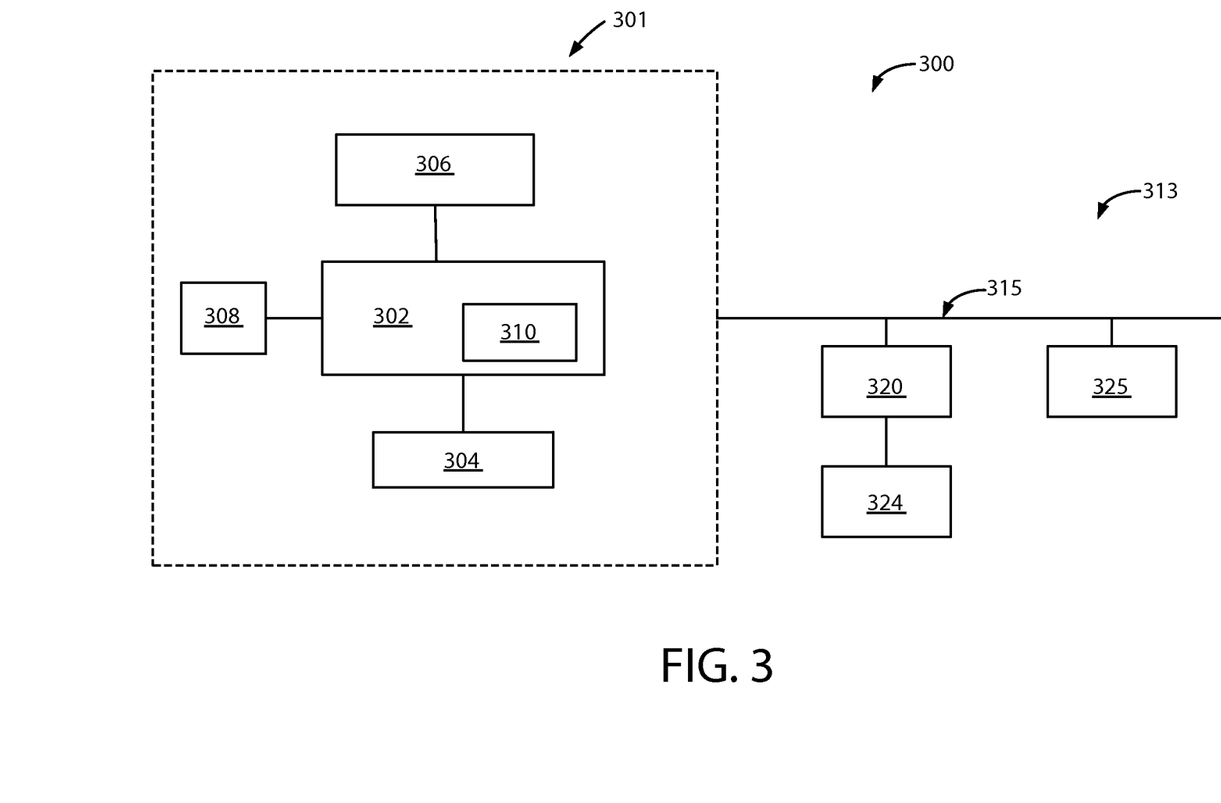
FIG. 3 depicts a block diagram of an example embodiment of a sensor-based implement height control system.

FIG. 3 shows a block diagram of an example system 300 that can be utilized in operating the vehicle 205 and implement 230. The system 300 includes a portion 301 that can be located in the cab of the vehicle 205, and an external portion 313 that can be located outside the vehicle cab 210. Portion 301 includes a computer 302 connected to a display 306 and a user input means 304. The computer 302 can comprise a processor such as an ARM processor. The computer 302 can function as a host computer that can work in combination with various control systems employed on the vehicle 205. For example, a Falcon® variable rate control system available from AGCO Corp. may be used control application of crop products, with the Falcon software executed by the computer 302. Similarly, a ViperPro guidance system developed by Raven Industries may be employed for providing implement guidance control in conjunction with a DGPS receiver. While the ViperPro system may utilize a separate user console, the computer 302 may cooperate with the ViperPro system so that ViperPro interface screens may be viewed on the display 306. The computer 302 can be configured to receive data from a global positioning system (GPS) unit 308, which can include a GPS receiver connected to a GPS antenna (not shown) mounted on the vehicle cab 210. As known in the art, the GPS is an accurate three-dimensional global positioning satellite system that can provide radar positioning and navigation needs for the vehicle 205. Example GPS systems that can be used include the "Dead Reckoning" systems and satellite positioning systems, such as AgNav™, Naystar Global Positioning System, Differential GOS Systems and other GOS based or equivalent systems to update a resident positioning and navigation database on a real-time basis.

The computer 302 can receive data from the external elements 313 of the control system 300 via bus 315. Preferably, the bus 315 is a controller area network (CAN) bus such as that developed by BOSCH and based on the International Organization for Standardization (ISO) 11783 protocol for agricultural vehicles. A CAN bus is a high-integrity serial data communications bus used for real-time control applications. The CAN bus is described in greater detail in "ISO 11783: An Electronic Communications Protocol for Agricultural Equipment", ASAE Distinguished Lecture #23, Agricultural Equipment Technology Conference, 7-10 Feb. 1999, Louisville, Ky. USA, ASAE Publication Number 913C1798, which is incorporated herein in its entirety by reference.

A height control module (HCM) 310 that can provide a virtual map of the topography of the field being navigated and, using the virtual map, provide height control commands that anticipate topography changes, is included in the system 300. In an exemplary embodiment, the HCM 310 comprises software, hardware, firmware or a combination thereof, and can be installed on and executed by the computer 302, or be separately self-contained and communicatively coupled to the computer 302. If embodied as a separate unit it is contemplated that HCM 310 can be communicatively coupled to other elements of the system 300 so as to receive sensor output and provide height change commands to the appropriate controlling entity to effect boom positioning.

External to the cab, but communicatively coupled to the computer 302, are the boom control unit (BCU) 320 and the sensor input module 325. The computer 302 can provide control commands to the BCU 320 via the bus 315. Similarly, the computer 302 can receive information from the BCU 320 and the sensor input module 325 via the bus 315. The sensor input module 325 can receive input from various types of sensors including ultrasonic sensors, displacement sensors, tilt sensors and the like disposed along the boom, as shown in FIG. 2. and provide it to the bus 315. However, an example system can include a plurality of individual sensor modules communicatively coupled to the bus 315, rather than a single sensor input module that combines input from a plurality of sensor assemblies.

The BCU 320 can control vertical and lateral movement of the boom sections 233-238. The BCU 320 can be coupled to actuators 324 which can include valves, electric motors, belts, pumps, or other similar devices that can be used to lift, tilt, lower or otherwise manipulate one or more boom sections. For example, the actuators 324 can include valve assemblies associated with hydraulic cylinders that can provide the required force to move a boom section a desired distance or angle. Although the example system 300 is shown as having only a single BCU 320, it is understood that a plurality of boom control units may be disposed along the width of the boom to provide the proper boom control for each boom section. In an example embodiment, the HCM 310 is configured to provide height change commands for the BCU 320, which in turn can command the elevation, lowering, rotating, and/or tilting of an implement, such as the boom section 238, by controlling the hydraulic valves (not shown) associated with one or more height cylinders and/or leveling cylinders associated with the boom section 238.

Figure 4:
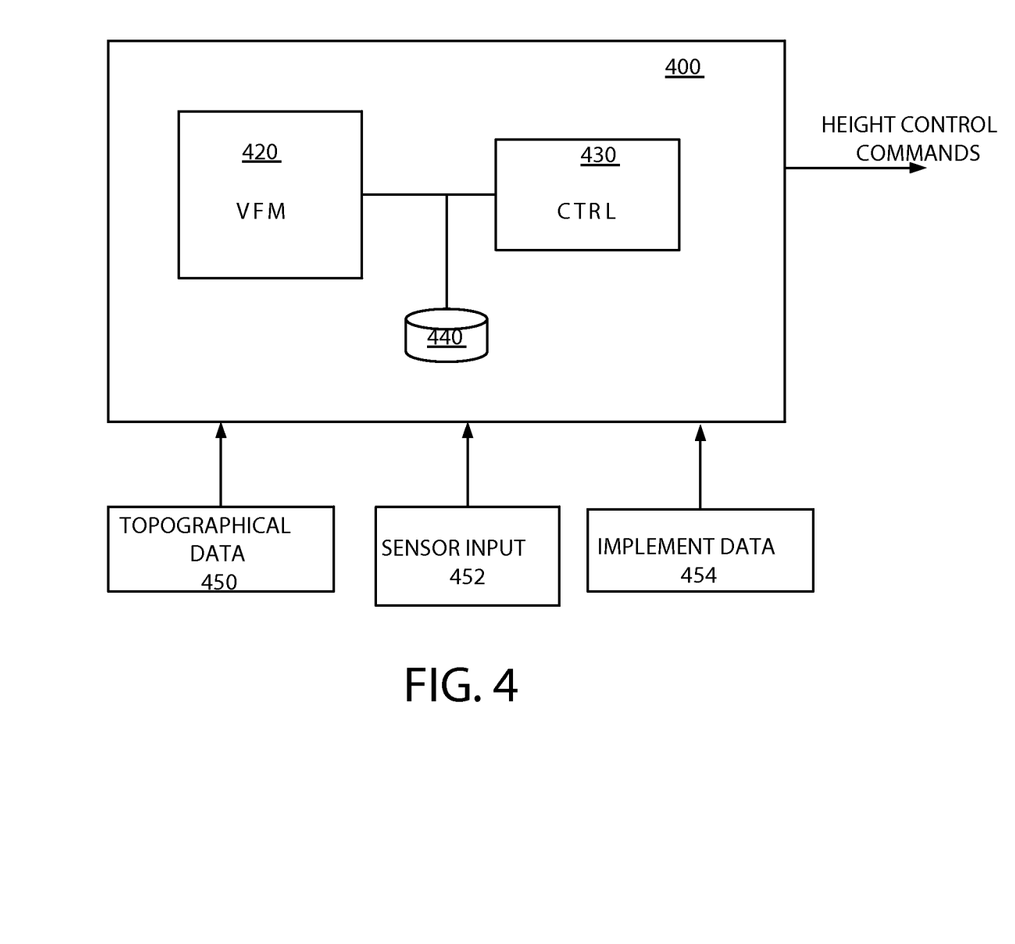
FIG. 4 depicts a block diagram of an example embodiment of a height control module.

FIG. 4 shows an example HCM 400. The HCM 400 can include a Virtual Field Module (VFM) 420, a controller 430 and a database 440. An example VFM 420 can be configured to receive topographical data 450 and, using the data 450, produce a virtual topographical field map that incorporates all known topographical information pertaining to the field to be traversed. The topographical data 450 can include three-dimensional data such as longitudinal location, latitudinal location and elevation. For example, a global positioning system (GPS) unit 308 can receive data via satellite transmission and provide the data to the VFM 420. In addition, topographical data recorded during previous field passes may be input to the VFM 420. For example, previous field pass data can be stored in the computer 302 and retrieved by the VFM 420 for use in generating a virtual field map. For example, the ViperPro guidance control system, which is preferably interoperable with the computer 302 can record field data obtained during field navigation that can be stored at computer 302. Topographical information can also be input manually be an operator, either through insertion of a computer readable medium at computer 302, or input by input means 304 which can be in the form of a keyboard, key pad, or other input means.

The VFM 420 can include mapping software that can convert the topographical information into a topographical map. Using the generated topographical map, the VFM 420 can provide a forward view polygon for one or more boom sections. The forward view polygon can include topographical information for an area in front of a boom section in the direction of forward motion.

The VFM 420 can be communicatively coupled to a controller 430 which can be configured to provide height change commands based on the forward view polygon. For example, via the CAN bus 315, the controller 430 can provide height change commands to the BCU 320, which can in turn execute the command to raise or lower the implement 230 by controlling the actuators 324, such as a valve assembly associated with the height cylinder associated with the particular boom section. The HCM 400 can be configured to receive implement data 454, such as the width of the implement, and a desired implement height above ground. For example, prompted by an interface screen displayed on display 306, such as an interface screen generated by ViperPro software for AutoBoom control, an operator can input implement data 454 into the computer 302 by any available input means, and the implement data 454 provided to the HCM 310. Preferably the implement data is stored in the database 440. The HCM 400 can also be configured to receive sensor input 452 which can comprise output from the various sensors positioned on the boom 230. The sensor input 452 can be used to verify absolute values in the virtual field map and forward polygons.

Figure 5:
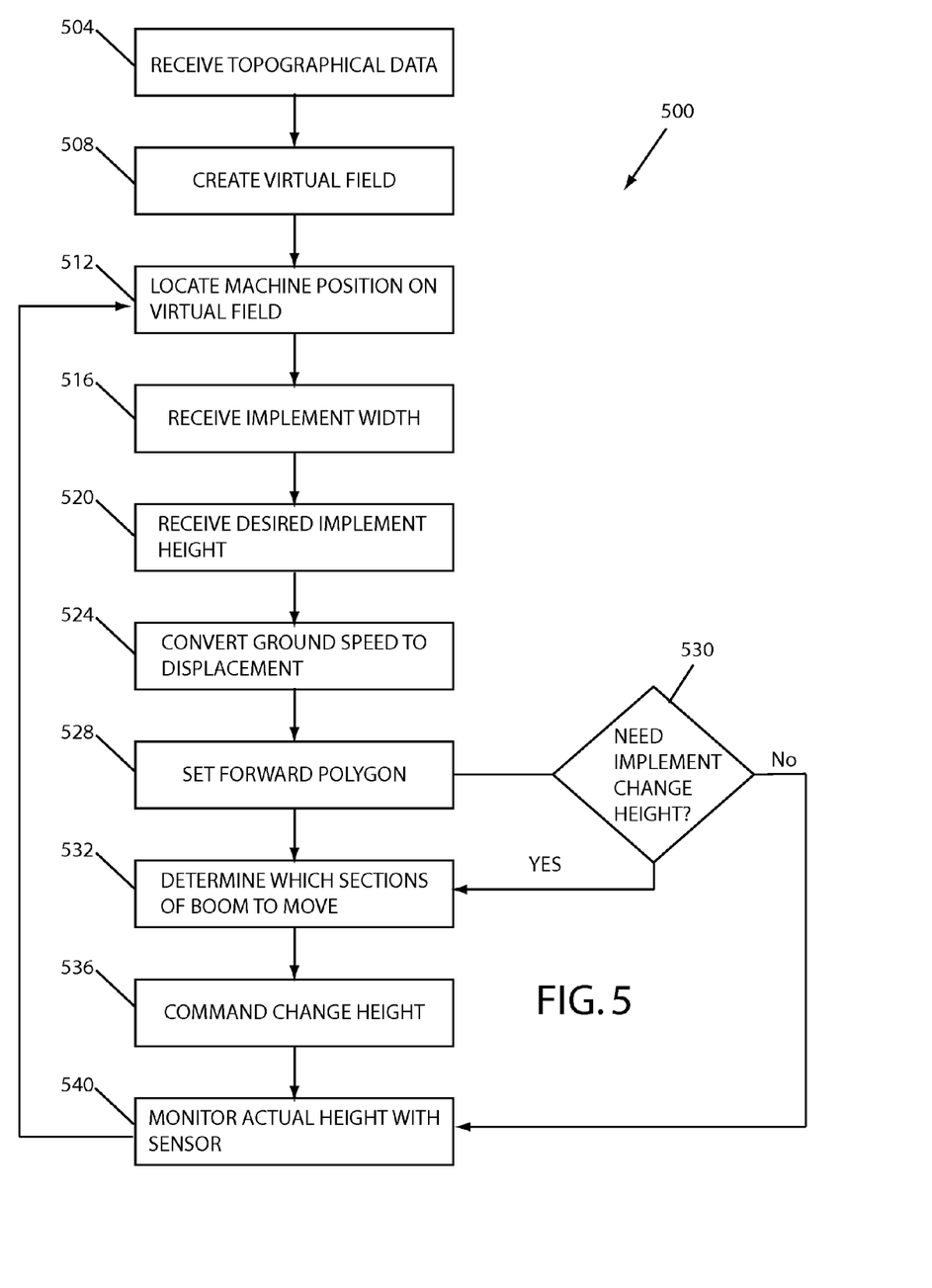
FIG. 5 depicts an example embodiment of a flow diagram for adjusting an implement.

FIG. 5 shows an example method 500 that can be employed to change the height of an agricultural implement. At block 504, the VFM 420 can receive topographical data. In an example embodiment, the VFM 420 receives GPS location and topographical information from the GPS unit 308, or retrieves previously acquired GPS data from storage at computer 302 or database 440. Topographical information from additional sources, such as electronic files, previous field pass data and user input data, can also be received at the VFM 420 as discussed above. The topographical information can comprise three-dimensional spatial data keyed to longitude and latitude as well as assorted geographical information such as the presence of streams. The combination of topographical data from a variety of sources provides a more complete assessment of topographical conditions than relying on GPS data alone, or real-time sensor information alone. For example, GPS data is based on the location of the GPS unit 308, and is therefore typically related to the center boom section associated with the vehicle cab 210, rather than the boom 230 extensions or wings. With boom spans of 90' or more, the topography of the ground traversed by the wings sections could be very different than that traversed by the center section. As discussed earlier, the difficulty with relying solely on height sensors is that their effectiveness is limited by vehicle speed and obstacle characteristics.

At block 508 the VFM 420 combines the available topographical information and generates a virtual field for the field to be canvassed. To generate a forward view polygon from the virtual field, the VFM 420 can apply relevant vehicle and implement parameters. At block 512, the current position of the vehicle 205 on the virtual field is located. For example, the vehicle 205 longitude and latitude coordinates can be obtained from the GPS unit 308 and used to determine vehicle 205 location on the virtual field. At block 516, the VFM 420 can receive the width of the implement 230. This parameter may be retrieved from a stored location on computer 302, from database 440, or may be input by an operator in response to a prompt on a user interface screen displayed on display 306. At block 520 the VFM 420 can receive a desired implement height, which can be specified as above the ground or above the crop surface. The vehicle operator can interact with a user interface screen on display 306 to input a desired implement height via a touch screen, or use the input means 304 which can be in the form of a keyboard, a computer mouse or other available input means. The desired implement height can be saved as a reference value and used as a basis for issuing height change commands. For example, if the desired implement height is 3' above the ground, the HCM 310 can issue height change commands that can change boom position in anticipation of changes in topography to maintain a 3' boom height above ground. Furthermore, where the implement comprises several movable sections, 233-238, individual sections may be moved as desired.

At block 524, displacement of the vehicle 105 from its original location on the virtual map is calculated based on the current vehicle 105 groundspeed. Groundspeed can be obtained from the GPS unit 308, or from the computer 302. For example, the vehicle 105 can be equipped with the ViperPro guidance system which cooperates with the computer 302 and can calculate, monitor and provide current groundspeed.

At block 528 the VFM 420 can provide a forward view polygon. The forward view polygon contains the topographical information of the field in front of the implement 230 in the direction of vehicle 205 forward motion. It is preferable that a forward view polygon is generated per boom section. Using the topographical information included in the forward view polygon, and the desired implement height reference value, at block 530 the HCM 310 can determine when a height change command should be provided. For example if the forward view polygon indicates a steep rise in elevation in the ground approached by the boom 230, the HCM 310 can determine that a height change command to raise the implement 230 should be provided in order to maintain a desired implement height above ground. The amount by which the implement is to be raised can be determined by calculating the difference between the current ground elevation and the ground elevation of the forward area as indicated by the forward view polygon. Likewise, if there is an obstacle that the boom must traverse, then a determination may be made at block 532 as to what section(s) of the boom should be manipulated. Using the current groundspeed of the vehicle, at block 536 the HCM 310 can provide a height change command to the BCU 320 in a timely manner that allows sufficient time for the boom 230 or particular boom section(s) to be elevated so as to avoid collision with the ground or obstacle. In an example embodiment the HCM 310 provides a height change command to the BCU 320 via the bus 315. Preferably, the height change command includes the distance by which the height needs to be adjusted. Having received the height change command, the BCU 320 can provide the control signals necessary to command the actuators 324 to raise the boom. For example, a control signal can be sent to a valve assembly associated with one or more height cylinders 242 so that one or more boom sections can be raised prior to encountering the incline. In an example embodiment, the height change signal can include the amount by which the height needs to be changed. For example, the required height difference can be converted to required cylinder displacement which can be used to control operation of the valve assemblies.

The amount by which the boom is raised can be monitored by, and/or calculated from, information obtained from the displacement sensor 244. For example, a piston can be used to either compress or expand the volume of liquid in the height cylinder 242, and accordingly, the length of the height cylinder 242 can be either shortened or lengthened. As discussed previously, the displacement sensor 244 can be in the form of a linear encoder that can encode position in an analog or digital signal which can then be provided to the BCU 320, for example by bus 315. The change in boom height can be calculated using the displacement of the piston associated with the height cylinder. In this manner, the BCU 320 can confirm that the boom has been raised the amount necessary to maintain the desired boom height as the vehicle approaches the incline. Although discussed in the context that the BCU 320 receives displacement sensor information to monitor boom height change, it is contemplated that an example system can include the HCM 310 receiving displacement sensor data, and in turn performing the monitoring and calculating functions. For example, the displacement sensor data could be received at controller 430 and used to determine whether the appropriate height change was performed or whether additional change commands or stop change commands need to be provided. Because the HCM 310 can anticipate changes in topography in advance, height change commands can be provided prior to the actual encounter with the topographical change. This is one of many advantages the example system has over height control systems that rely solely on boom-mounted sensors that are configured to detect the distance between the sensors and the ground beneath them. By the time the sensors detect a change in distance to the ground, it may be too late to avoid a collision.

After the boom height has been changed, the actual height of the boom can be monitored by a sensor array deployed on the boom. As discussed earlier, sensors 140 can detect the distance between themselves and the ground or crop surface. This information can be provided to the bus 315 to allow access by the BCU 320, computer 305, and/or HCM 310. The actual height data can be used to verify any absolute values used by the system 300, and to correct or modify data stored at the computer, at the database 440 or included in the virtual map generated by the VFM 420. The method can continue by returning to block 512.

The example method 500 provides boom height change commands tailored to a boom in anticipation of topographical changes in the terrain in front of the boom. In this manner, if the forward polygon associated with boom section 238 indicates a downward slope, but the forward polygon associated with boom section 233 indicates no change in topography, a change height command can be provided for boom section 238, but not boom section 233, so that a desired height above ground can be maintained.

As mentioned above, the values obtained by a system for a particular field may be used later to minimize downtime and maximize the effectiveness of labor. Therefore, the position of the vehicle 205 relative to an object may change between passes in the field as the vehicle's approach is optimized. The method uses topographical information for best practices for the machine operator. For example, additional obstacles may have been added, or previous obstacles removed between passes of the vehicle over the field, thereby requiring an adjustment to the virtual field and a different manipulation of the implement.

Figure 6:
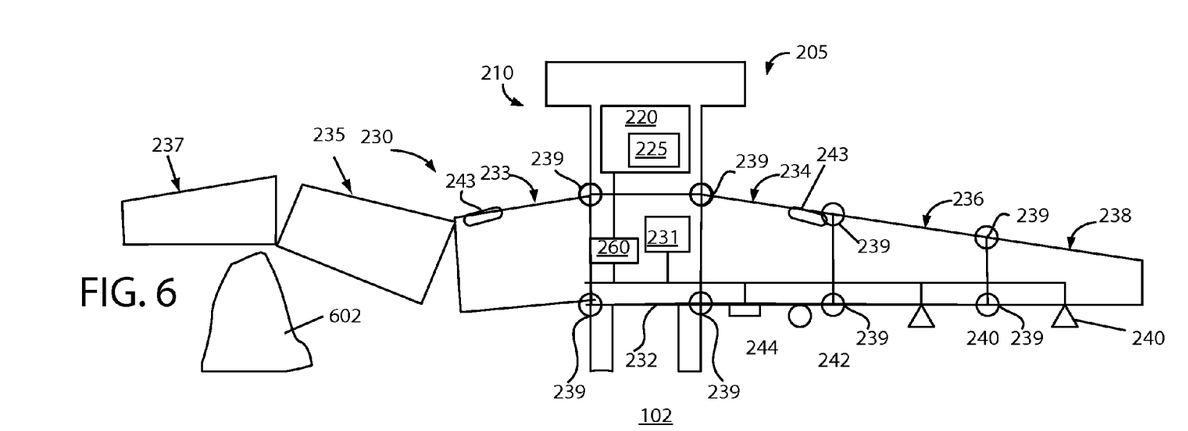
FIG. 6 shows an example embodiment of a vehicle manipulating an implement while approaching an object in the field from a first direction.
Figure 7:
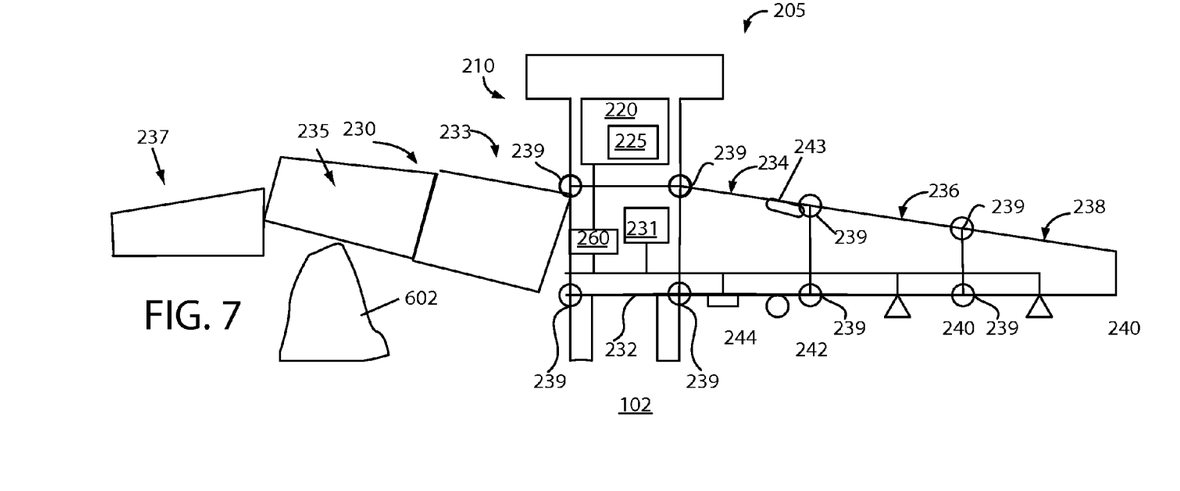
FIG. 7 shows the vehicle of FIG. 6 manipulating an implement while approaching an object in the field from a second direction.
Figure 8:
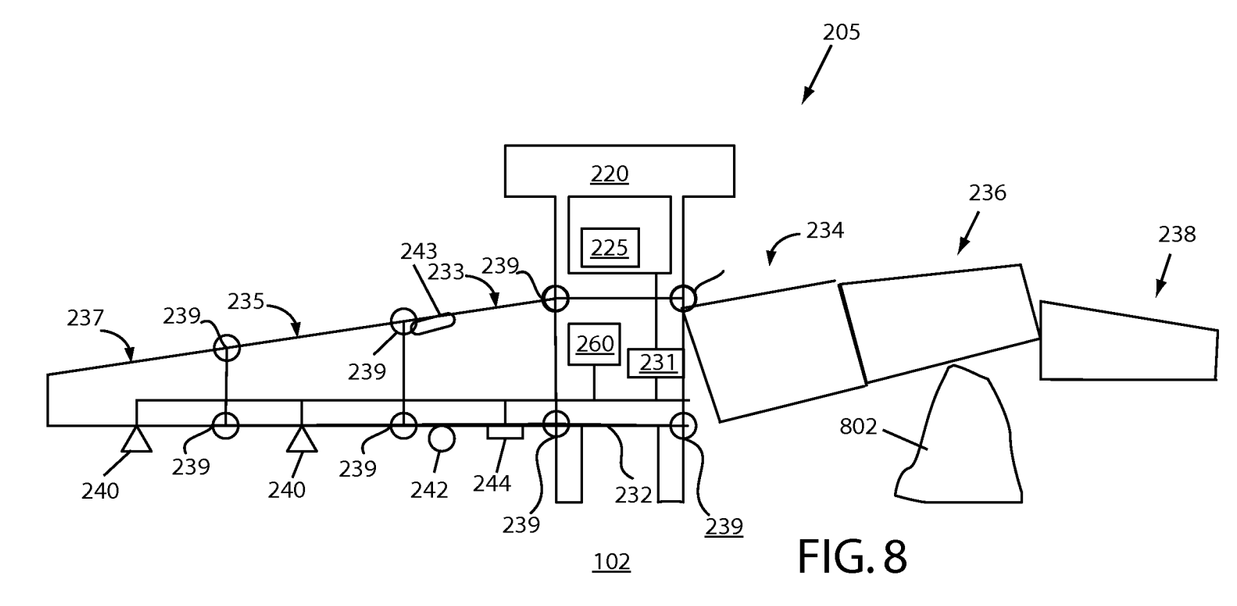
FIG. 8 shows the vehicle of FIG. 6 manipulating an implement while approaching an object in the field from a third direction.

FIGS. 6-8 show a vehicle 205 traversing an obstacle 602 in the field along different paths in which the system 200 may be used to manipulate the boom 230. In FIG. 6 the vehicle 205 approaches an obstacle 802 from a first direction. The position of the vehicle 205 and object 802 in the virtual field can be used to anticipate the desired movement of the boom 230 so that the appropriate boom sections 233, 235, and 237 are appropriately arranged for traversing the object 802 as the vehicle 205 approaches the object. For example, a boulder may be positioned over a hill in a field, such that an operator unfamiliar with the field may not have sufficient time to adjust the boom 230 to avoid the object once it is sighted.

FIG. 7 shows a later pass wherein the vehicle traverses the object at a slightly different approach, thereby requiring a different manipulation of the boom sections 233, 235, and 237 based upon the position of the vehicle 205 relative the object. FIG. 8 shows a later pass of the vehicle 205 in which the vehicle is positioned in the field 102 relative to the object 802 such that boom sections 234, 236, and 238 are manipulated to traverse the object. The system thus allows the vehicle to anticipate the desired movement of the boom 230 and/or particular boom sections.

In addition to manipulating the boom 230 to traverse objects in the field the boom may be adjusted due to different or additional data input. For example, a wind speed sensor (not shown) may be used to determine the wind speed, a desired implement height may be determined in response to the wind speed, and the implement manipulated in accordance to the desired implement height. For example, high winds may make it desirable to lower the height of the boom 230 or particular boom sections. In addition, the boom 230 and various boom sections may be moved when the vehicle 205 is turned in the field, near a fence, etc. In addition, the height and angle of the boom sections may be mapped to the field position and various pivot points of the boom 230 can be manipulated in accordance with the virtual map created. In other words, each potential movement of the boom 230 can be considered when determining how best to position the boom 230, whether it is raising, lowering, twisting, tilting, etc.

The systems and methods presented herein can provide height control commands that anticipate changes in the topography of a field traversed by an agricultural vehicle, thereby decreasing the likelihood of damage to an implement or to a crop. Topographic data from a variety of sources can be combined to produce a virtual field map. Using the information contained in the virtual field map, a forward view polygon can be set for a portion of an implement, and used as a basis for providing height change commands to an implement controller; a method that enhances prior art reliance on real-time sensor data to indicate a need to change the implement height. Real-time sensor data can be used to verify absolute values for the process and to verify height changes.

Various examples have been set forth herein to provide an understanding of the invention, but the invention is not limited to the example embodiments and additional embodiments will occur to those skilled in the art. Although the invention has been discussed with respect to specific embodiments, thereof, the embodiments are merely illustrative, not restrictive of the invention. Numerous specific details are provided, such as examples of components and methods, to provide a thorough understanding of the invention. One skilled in the relevant art will recognize, however, that an embodiment of the invention can be practiced without one or more of the specific details, or with other apparatus, systems, methods, components and/or the like. For example, while the disclosure discusses the manipulation of a boom 230, the legs of a vehicle may also be similarly manipulated. For example, a sensor on a hydraulic cylinder may be provided on a vehicle leg and manipulated in response to the virtual field, such as extending or retracting the leg. In other instances, well-known structures or operations are not specifically shown or described in detail to avoid obscuring aspects of embodiments of the present invention. Reference throughout this specification to "one embodiment", "an embodiment", "example embodiment", or "specific embodiment" does not necessarily reference the same embodiment, and furthermore means that a particular feature, structure or characteristic described in connection with the embodiment is included in at least one embodiment of the present invention but not necessarily in all embodiments. Embodiments may be implemented by using a programmed general purpose processor, application specific integrated circuits, programmable logic devices, field programmable gate arrays, or by any means as is known in the art. It will also be appreciated that one or more of the elements depicted in the drawings can also be implemented in a more separated or integrated manner, or even removed as is useful in accordance with a particular application. As used in the description herein and throughout the claims that follow, "a", "an" and "the" include plural references unless the context dictates otherwise.

Thus, while the present invention has been described herein with reference to particular embodiments thereof, latitude of modifications, various changes and substitutions is intended in the foregoing descriptions. It is understood that the invention is not to be limited to the particular terms used in the following claims, but that the invention will include any and all embodiments and equivalents falling within the scope of the appended claims.

What is claimed is:

1. A combination implement and system for providing height change commands for said implement, said combination comprising:
   an implement comprising a plurality of sections with adjacent sections movably connected to one another about pivot points, the system comprising:
   a plurality of actuators configured to move said plurality of implement sections so that adjacent sections pivot with respect to each other;
   a height control module configured to interact with a computer, and configured to receive topographical data and provide a virtual field map based on said topographical data, wherein said height control module generates forward view polygons for each section of said implement based on said virtual field map, determines if the height of one or more of the plurality of sections is to be changed, and generates height change commands for each section of said implement based on said forward view polygons; and
   an implement control unit configured to receive said height change commands for each section of said implement and actuate said plurality of actuators in response to said height change commands to control movement of the plurality of sections of said implement such that at least one sections is manipulated a different amount than another section in response to the generated forward view polygons.

2. The combination of claim 1, further comprising one or more displacement sensors for providing data pertaining to movement of said implement.

3. The combination of claim 2, wherein said data comprises displacement data for a hydraulic cylinder used to effect said implement movement.

4. The combination of claim 1, further comprising one or more height-finding sensors.

* * * * *